United States Patent
Landwehr

(10) Patent No.: US 6,749,246 B2
(45) Date of Patent: Jun. 15, 2004

(54) INTEGRATED TAILGATE AND LOADING RAMPS

(76) Inventor: Kenneth R. Landwehr, 10035 Road 19, Cloverdale, OH (US) 45827

( * ) Notice: Subject to any disclaimer, the term of this patent is extended or adjusted under 35 U.S.C. 154(b) by 0 days.

(21) Appl. No.: 10/194,509

(22) Filed: Jul. 12, 2002

(65) Prior Publication Data

US 2003/0015885 A1 Jan. 23, 2003

Related U.S. Application Data

(60) Provisional application No. 60/306,676, filed on Jul. 20, 2001.

(51) Int. Cl.[7] .............................................. B62D 33/03
(52) U.S. Cl. ......................................... 296/61; 414/537
(58) Field of Search .............................. 296/61, 50, 51, 296/57.1, 62; 414/537

(56) References Cited

U.S. PATENT DOCUMENTS

| | | | | |
|---|---|---|---|---|
| 3,319,811 A | * | 5/1967 | Martin, Jr. .................. 414/537 |
| 4,003,483 A | | 1/1977 | Fulton | |
| 4,668,002 A | * | 5/1987 | Hanson ........................ 296/61 |
| 4,735,454 A | | 4/1988 | Bernard | |
| 4,944,546 A | * | 7/1990 | Keller ......................... 108/130 |
| 5,133,584 A | | 7/1992 | McCleary | |
| 5,156,432 A | | 10/1992 | McCleary | |
| 5,205,603 A | * | 4/1993 | Burdette, Jr. ................ 182/195 |
| 5,211,437 A | | 5/1993 | Gerulf | |
| 5,244,335 A | * | 9/1993 | Johns ........................... 296/61 |
| 5,273,335 A | * | 12/1993 | Belnap et al. ................ 14/71.1 |
| 5,312,149 A | | 5/1994 | Boone | |
| 5,425,564 A | * | 6/1995 | Thayer ....................... 296/57.1 |
| 5,468,114 A | * | 11/1995 | Hickerson .................... 14/71.1 |
| 5,536,058 A | * | 7/1996 | Otis ............................. 296/61 |
| 5,538,307 A | * | 7/1996 | Otis ............................. 296/61 |
| 5,803,523 A | * | 9/1998 | Clark et al. .................. 14/71.1 |
| 6,059,344 A | | 5/2000 | Radosevich | |

* cited by examiner

Primary Examiner—D. Glenn Dayoan
Assistant Examiner—Patricia Engle
(74) Attorney, Agent, or Firm—Brinks Hofer Gilson & Lione

(57) ABSTRACT

An apparatus is provided for closing a vehicle storage compartment. The apparatus includes: a housing which resembles a tailgate of a vehicle and wherein the housing has one or more loading surfaces. The loading surfaces can be removed from the tailgate, placed into a loading position and used for loading items into or out of a vehicle storage compartment. Thereafter, the loading surfaces may be transformed into a storage position and placed within the housing.

15 Claims, 9 Drawing Sheets

INTEGRATED TAILGATE AND LOADING RAMPS

CROSS-REFERENCE TO RELATED APPLICATIONS

The present invention claims priority to U.S. Provisional Serial No. 60/306,676, filed on Jul. 20, 2001 and entitled "INTEGRATED TAILGATE AND LOADING RAMPS FOR LIGHT DUTY TRUCKS".

TECHNICAL FIELD

This invention relates to systems and methods for loading objects into a pickup truck and wherein the ramps are stored in the tailgate.

BACKGROUND

Pickup trucks and similar vehicles having truck beds are frequently used to transport objects, such as motorcycles, all terrain vehicles, tractors, mowers, and the like. There has been a continuous effort since the advent of vehicles with truck beds to produce an efficient means of transferring these objects from the ground to the truck bed.

Early prior art solutions utilized ramps, which were designed to be carried within the truck bed. However, this type of design wasted usable space in the truck bed and added significant weight to the vehicle, thereby reducing the effective load capacity of the truck.

Another prior art solution to this problem focused on combining the tailgate of the truck and ramps. The complexity in design of combination tailgate and ramp systems has ranged from simple designs consisting of large, cumbersome tailgates that unfold to form a ramp to intricate designs involving telescopic ramps that are housed within a tailgate.

Other devices disclosed in U.S. Pat. No. 4,003,483, issued to Fulton, U.S. Pat. No. 5,211,437, issued to Gerulf, and U.S. Pat. No. 5,425,564, issued to Thayer, address the load capacity problem by pivoting a panel located in the position of a conventional tailgate about its vertical axis then rotating the panel 90 degrees so the height of the panel rests along the horizontal axis of the assembled configuration. The panel is then lowered to create a surface that runs from the ground to the rear edge of the truck bed. One problem with this design is that the length of the ramp is restricted to the width of the truck bed. Therefore, the ramp is steeply inclined resulting in a higher degree of difficulty in transferring objects to and from the truck bed.

Other devices, disclosed in U.S. Pat. No. 5,133,584 and U.S. Pat. No. 5,156,432, both issued to McCleary, involve a relatively large apparatus that attaches to the original tailgate and unfolds rearward to form a ramp. While these designs adequately address the issue of ramp length, they are large and rather cumbersome devices that tend to reduce the effective loading capacity of the truck by adding weight to the truck and taking up space in the truck bed.

Two devices, U.S. Pat. No. 5,273,335, issued to Belnap, and U.S. Pat. No. 5,312,149, issued to Boone, adequately address both the ramp length issue and the loading capacity issue by using telescopic ramps that are stored within the tailgate. To use these devices, the tailgate is lowered to the horizontal position and telescopic ramps are horizontally pulled out of the tailgate. These ramps form a surface that runs from the ground to the truck bed, The devices are contained within the area typically occupied by a conventional tailgate; therefore, the loading capacity of the truck is only marginally affected, if at all. Additionally, the telescopic ramps allow a relatively longer ramp surface, which results in a more gradual ramp incline. However, the telescopic design of the ramps results in a very complex apparatus. Additionally, because these devices are permanently attached to the vehicle, the vehicle's utility is restricted to tasks that can be achieved while the tailgate is in place.

Therefore, there is a need for an apparatus comprised of long and relatively simply designed ramps and a tailgate capable of housing these ramps so as not to decrease the loading capacity of the truck. Moreover, there is a need for an apparatus that may be easily converted to allow the vehicle to be used in operations that normally require the removal of the tailgate. Finally, the apparatus must maintain a close resemblance to a conventional tailgate, thereby helping to maintain the aesthetic qualities of the vehicle.

SUMMARY

In a preferred embodiment of the present invention a tailgate and a pair of detachable ramps that can be folded and stored within the tailgate are provided. When housed within the tailgate, the ramps stretch across the width of the tailgate. This configuration allows the ramps to be relatively long, which reduces the degree of inclination of the ramps, with respect to the ground, when the ramps are unfolded and in the loading position.

In another embodiment of the present invention, the ramps are detachable, thus, increasing the utility of the vehicle.

Preferably, the ramps may be positioned at various points along the base of the tailgate to accommodate objects of various shapes and sizes.

In an alternative embodiment, the ramps are removed from the tailgate to allow the vehicle to accommodate a fifth wheel RV without removing the entire tailgate.

In yet another embodiment, the ramps are removed from the tailgate and replaced by a grate or mesh structure to form an airgate. The replacement of conventional tailgates with airgates is well known in the art.

In a preferred embodiment, the tailgate is located in the conventional position and uses a conventional latching mechanism.

In yet another embodiment, the ramps are secured within the tailgate space.

In still another embodiment of the present invention, a hinged plate and a protruding lip fix the ramps within the tailgate.

Preferably, when the ramps are stored within the tailgate, the resultant apparatus closely resembles a conventional tailgate.

In an embodiment of the present invention, the ramps are comprised of two portions, an upper portion and a lower portion. The ramps are configured in a way that allows the lower portion of the ramp to be folded into the upper portion of the ramp. A c-channel is attached to the upper portion of each ramp. When the ramps are unfolded, the c-channel may be attachable to the base of the tailgate to form sturdy, gradually inclining ramps. The ramps may be positioned anywhere along the base of the tailgate, which allows the ramps to be used to easily load and unload objects of various shapes and sizes.

In yet another embodiment of the present invention, the invention may be easily configured to accommodate a fifth wheel RV. By removing both ramps, a large portion of the tailgate is open, which allows sufficient room for a fifth wheel RV to be hitched to the vehicle.

In yet another embodiment, the ramps may be removed and replaced by a grate or mesh structure, thereby improving gas mileage.

These and other aspects and advantages of the present invention will become apparent upon reading the following detailed description of the invention in combination with the accompanying drawings.

DETAILED DESCRIPTION

Figure 1A:
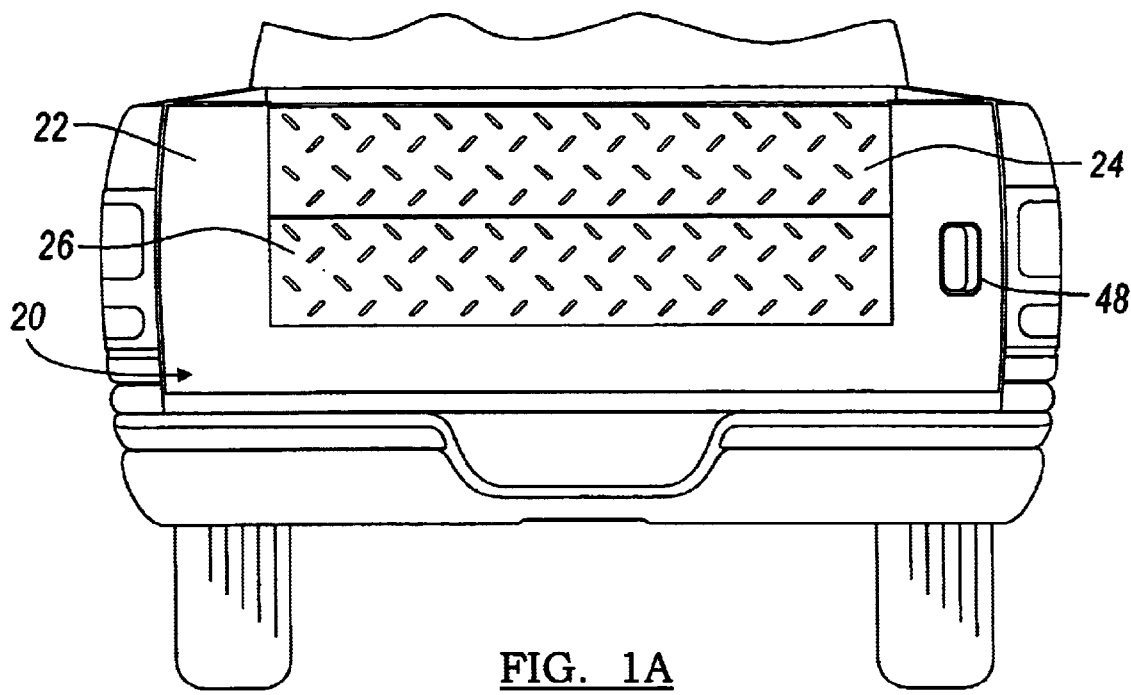
FIG. 1a is a rear view of a vehicle illustrating an apparatus shown in a closed and vertical position with two ramps, in accordance with the present invention.
Figure 1B:
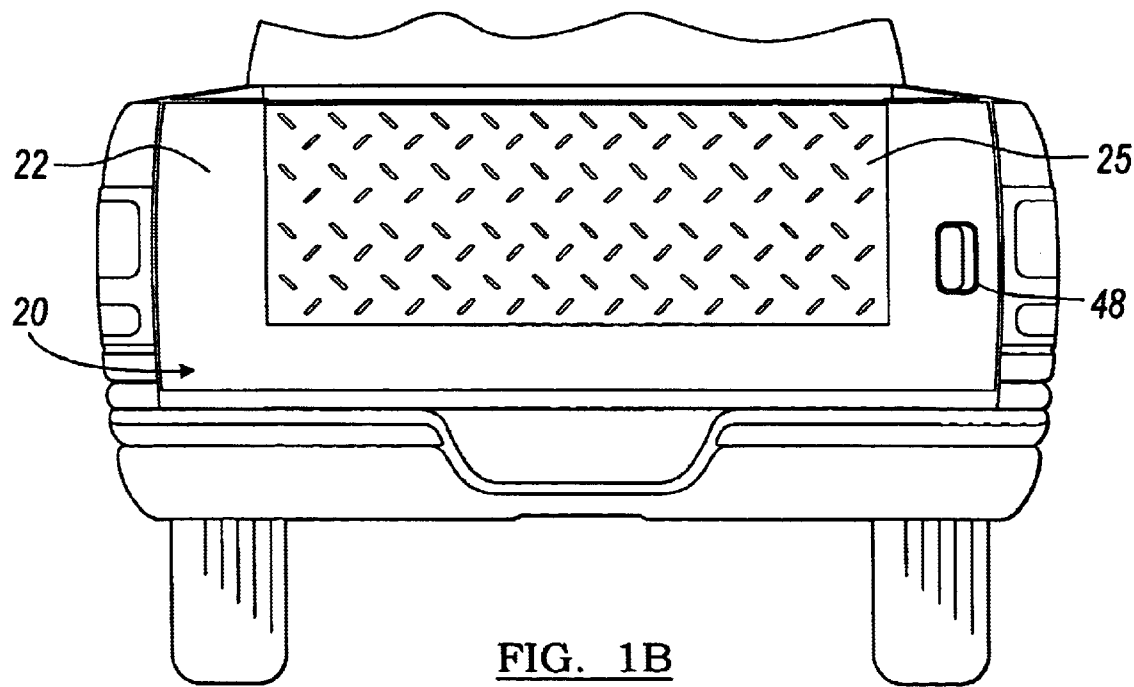
FIG. 1b is a rear view of a vehicle illustrating an apparatus shown in a closed and vertical position with one ramp, in accordance with the present invention.

Referring now to FIG. 1a, an apparatus 20 is illustrated, in accordance with the present invention. Apparatus 20 includes a housing 22 and generally two ramps 24 and 26. Alternatively, as shown in FIG. 1b, one ramp 25 may be used. The apparatus 20 is convertible from a tailgate to a ramp by simply lowering apparatus 20 into a horizontal position, removing ramps 24 and 26 from housing 22, unfolding ramps 24 and 26, and attaching the upper ends of ramps 24 and 26 to housing 22. This creates an inclined surface extending from the ground to a truckbed of a vehicle.

Figure 2:
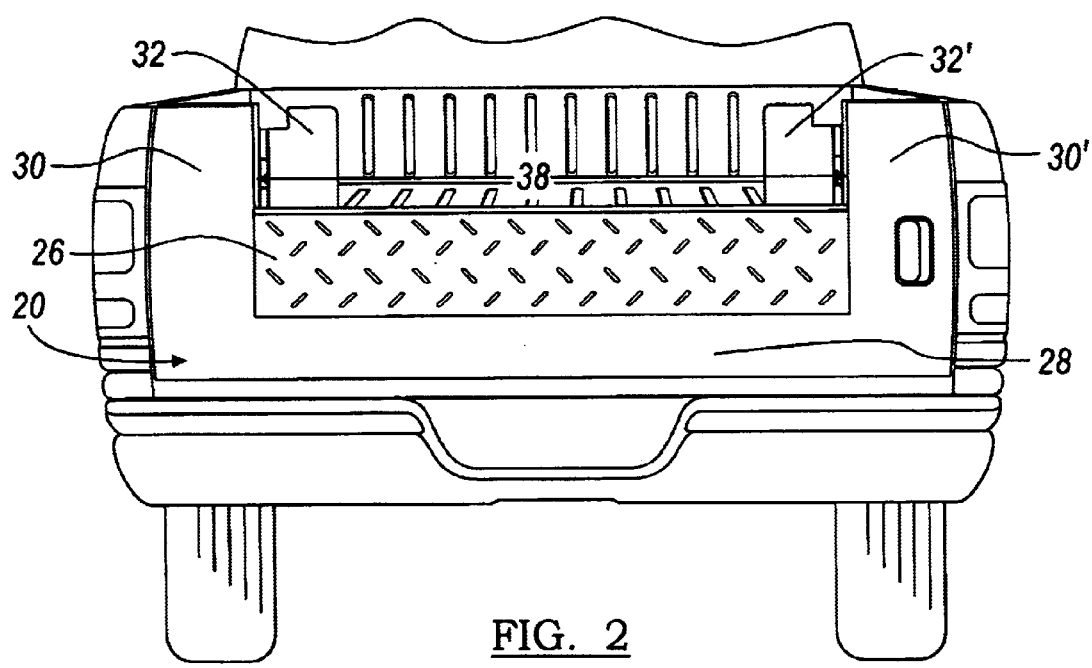
FIG. 2 is a rear view of a vehicle illustrating an apparatus shown in a closed and vertical position with one ramp removed, in accordance with the present invention.
Figure 3:
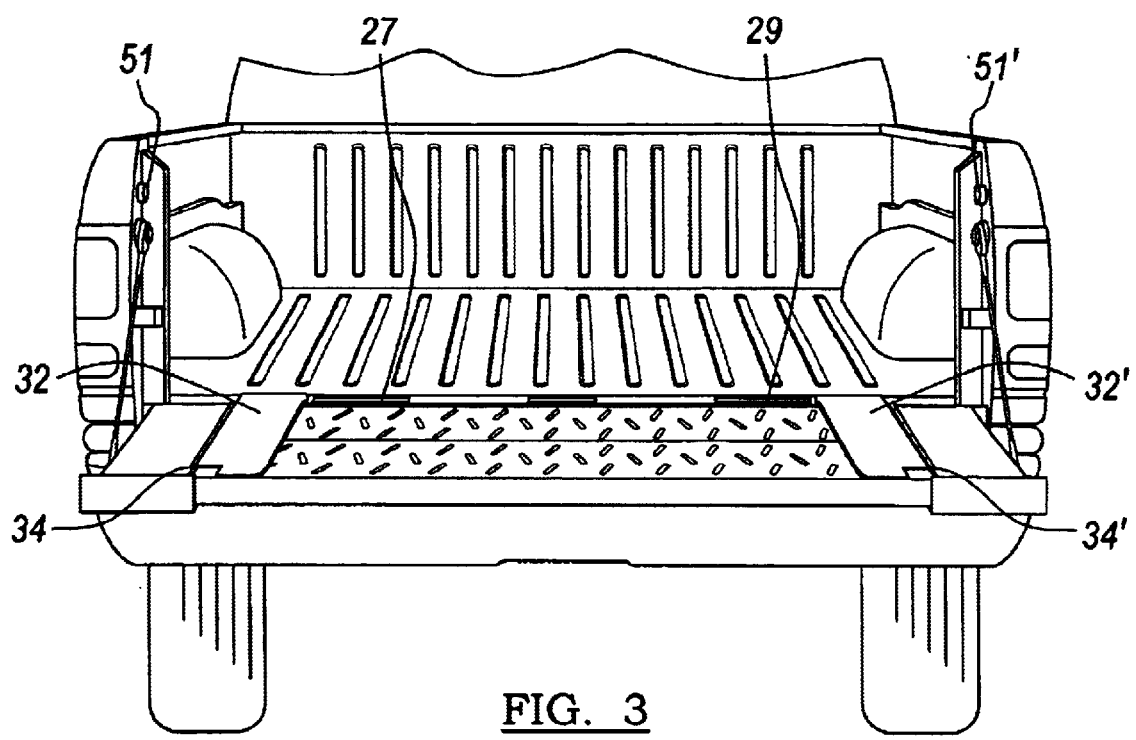
FIG. 3 is a rear view of a vehicle illustrating an apparatus shown in an open and horizontal position, in accordance with the present invention.

In FIGS. 2–3, apparatus 20 is shown pivotally attached to a vehicle. Housing 22, as shown, has a housing base 28, side portions 30 and 30', retainers 32 and 32', and a ramp-housing receptacle 38. The function of the housing base 28 is to support ramps 24 and 26 both when ramps 24 and 26 are stored in the housing, as shown in FIG. 1, and when ramps 24 and 26 are being used as ramps (shown in FIGS. 9 and 10).

Figure 4:
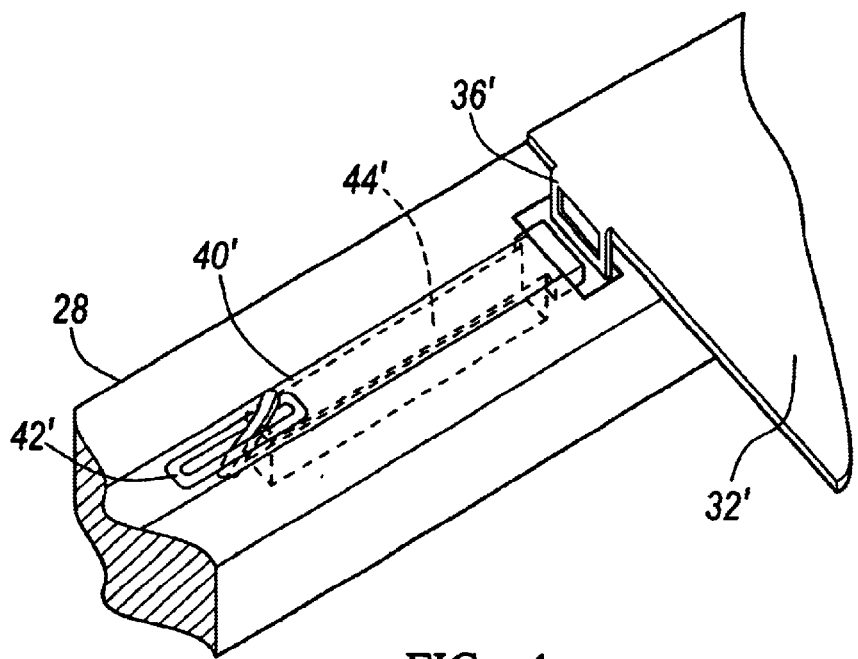
FIG. 4 is a schematic illustration of a latching mechanism, in accordance with the present invention.

In addition to providing support for ramps 24 and 26, housing base 28 includes retainer latch mechanisms 40 and 40' for securing retainers 32 and 32', which, in turn, secure ramps 24 and 26 within receptacle 38. Latch mechanisms 40 and 40' are substantially identical, and are located at opposite sides 27 and 29 of housing base 28. As shown schematically in FIG. 4, latch mechanism 40' includes a latch lever 42' and a latching rod 44'. Latch mechanism 40' is of the type conventionally used in residential or commercial doors. Plate 32' may be secured in a closed position by activating lever 42' causing rod 44' to penetrate an eyelet 36' in retainer 32'.

Housing base 28 and latch mechanisms 40 and 40', like the rest of housing 22, are preferably constructed from steel to maximize strength and durability. Alternatively, any other suitable material, such as aluminum, plastic, fiberglass, metal alloys, or composites, may be used to construct housing base 28 and latch mechanisms 40 and 40', or any other parts of housing 22.

Figure 5:
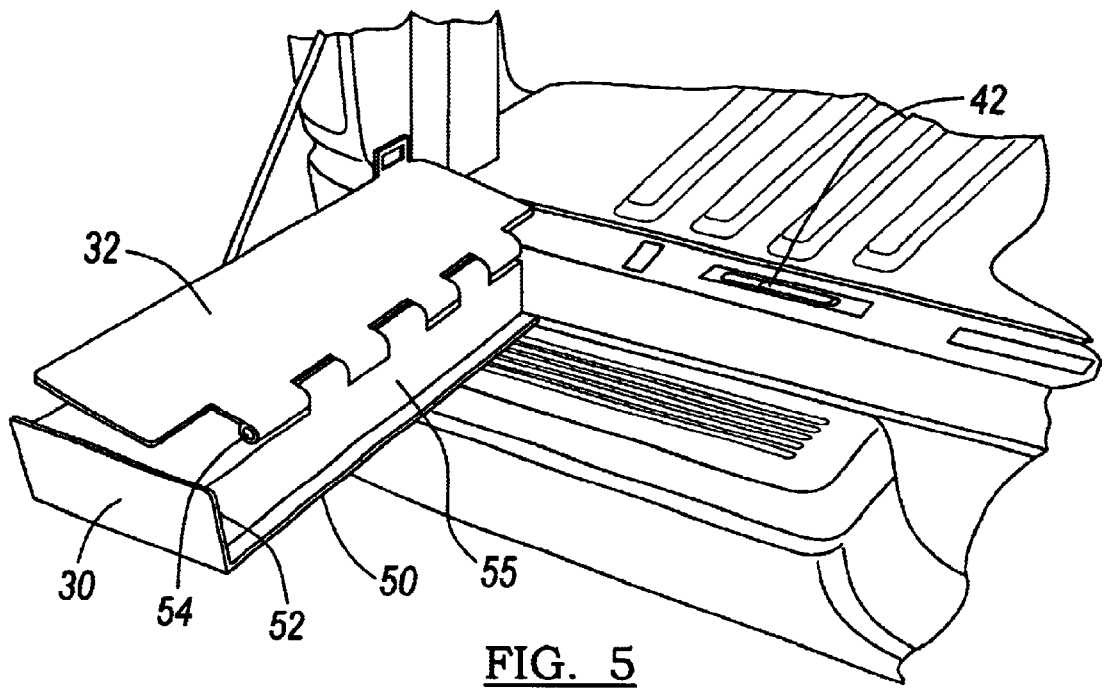
FIGS. 5 and 6 are perspective views of an apparatus shown in an open and horizontal position with ramps removed, in accordance with the present invention.
Figure 6:
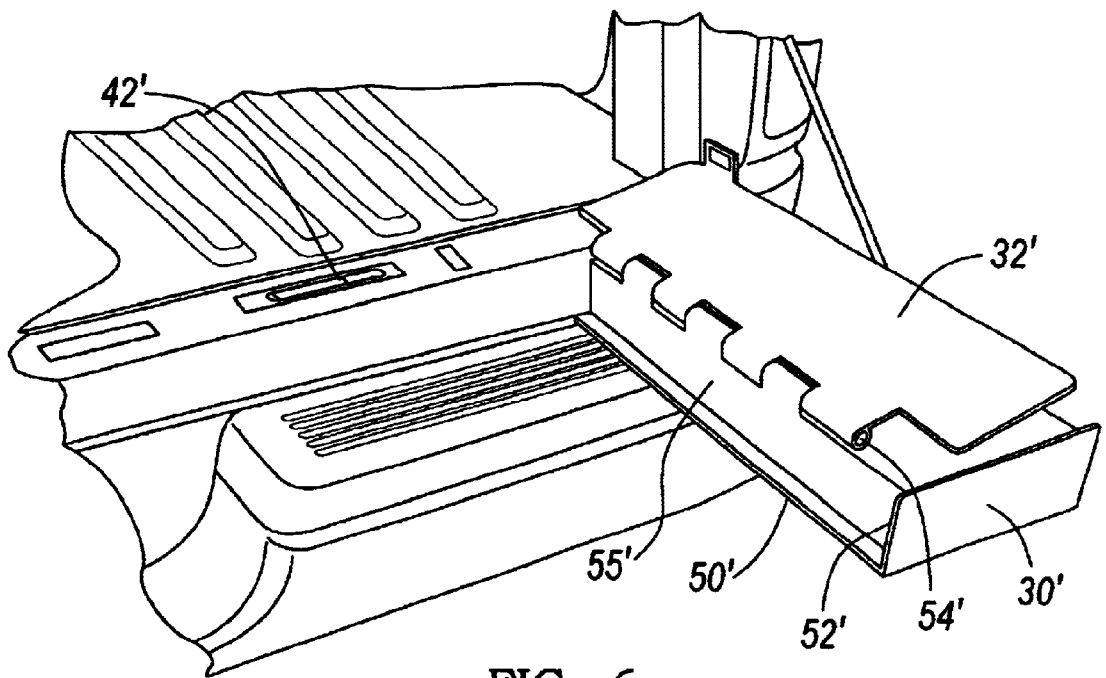

With reference to FIGS. 5 and 6, side portions 30 and 30' of housing 22 having surfaces 55 and 55' are illustrated. Extending inward from surfaces 55 and 55' is an outer edge lip 50 and 50', an upper edge lip 52 and 52', and an inner edge lip 54 and 54', which secure ramps 24 and 26 within receptacle 38 of housing 22.

Figure 7:
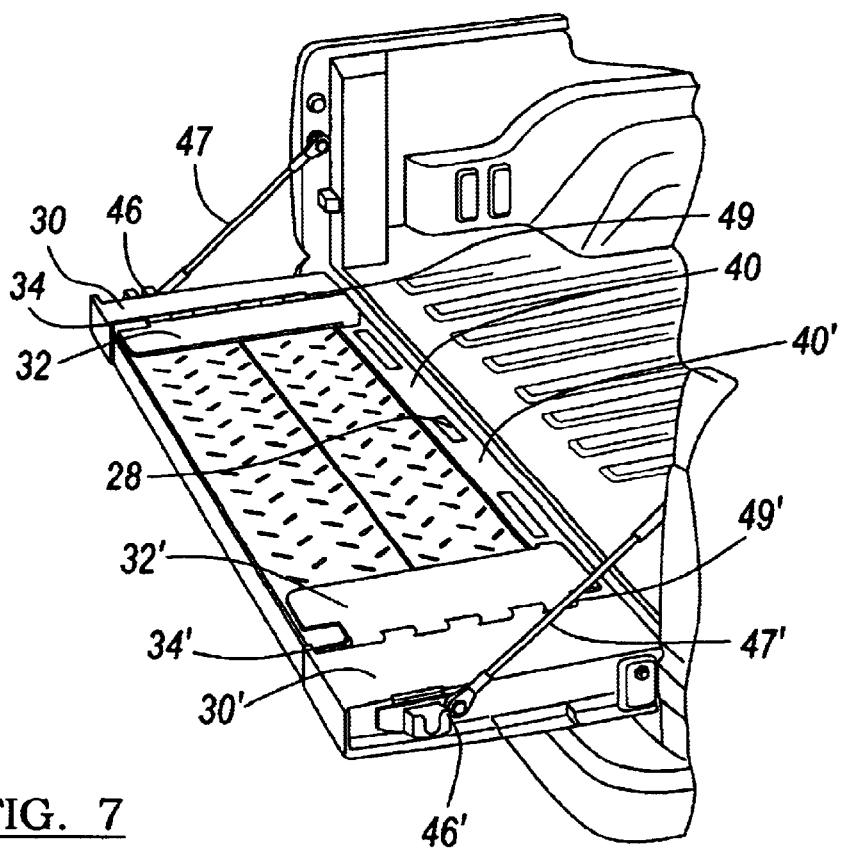
FIG. 7 is a perspective view of an apparatus shown in an open and horizontal position with ramps stored in a tailgate housing, in accordance with the present invention.

As shown in FIG. 7, a pair of tailgate latches 46 and 46' are attached to side portions 30 and 30' for securing housing 22 in a closed vertical position. Apparatus 20 is placed in the closed position by pushing housing 22 into a vertical position causing latches 46 and 46' to engage locking brackets 51 and 51' (shown in FIG. 3) on the vehicle. Latches 46 and 46' may be disengaged by pulling a tailgate latch lever 48, which is preferably coupled to latches 46 and 46' by a cable and/or mechanical linkages in a conventional manner. Lever 48 is preferably located on side portion 30', as shown in FIG. 1. Alternatively, lever 48 may be located at any other suitable location on housing 22. Tailgate latches 46 and 46' discussed above may be conventional tailgate latch items that are known in the art.

Support members 47 and 47' are provided for supporting apparatus 20 when in a horizontal position. Support members 47 and 47' are fixed at one end to housing 22 and at the other end to the vehicle.

Retainers 32 and 32', as illustrated in FIG. 7, function to secure ramps 24 and 26 when ramps 24 and 26 are stored within receptacle 38 of housing 22. Retainers 32 and 32' are mirror images of one another, and are placed on opposite ends of housing 22. Retainers 32 and 32' are attached to side portions 30 and 30' by hinges 34 and 34'. Hinges 34 and 34' allow retainers 32 and 32' to pivot about edges 49 and 49' of retainers 32 and 32', respectively, which allows ramps 24 and 26 to be inserted and removed from receptacle 38 of housing 22 or secured within receptacle 38 of housing 22. As discussed above, plates retainers 32 and 32' contain eyelets 36 and 36', which act to secure plates retainers 32 and 32' in a closed position, as shown in FIG. 7, when latch mechanisms 40 and 40' are activated.

Figure 8:
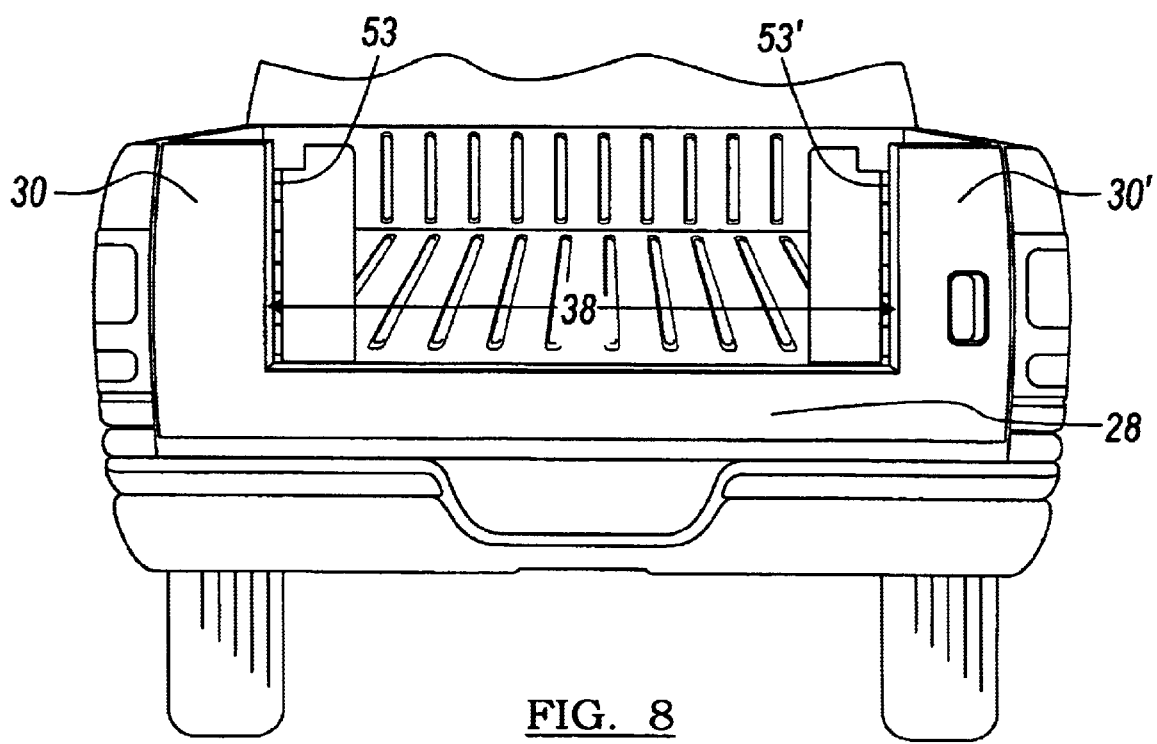
FIG. 8 is a rear view of a vehicle illustrating an apparatus shown in a closed and vertical position with ramps removed, in accordance with the present invention.

As shown in FIG. 8, receptacle 38 is defined by a top surface of housing base 28 and sides 53 and 53' of side portions 30 and 30'. The function of receptacle 38 is to allow for storage of ramps 24 and 26 within housing 22. Ramps 24 and 26 rest within receptacle 38 when stored in housing 22, as shown in FIG. 1. Receptacle 38 is preferably configured to hold two ramps. Alternatively, receptacle 38 may be configured to hold more or less than two ramps.

Figure 9:
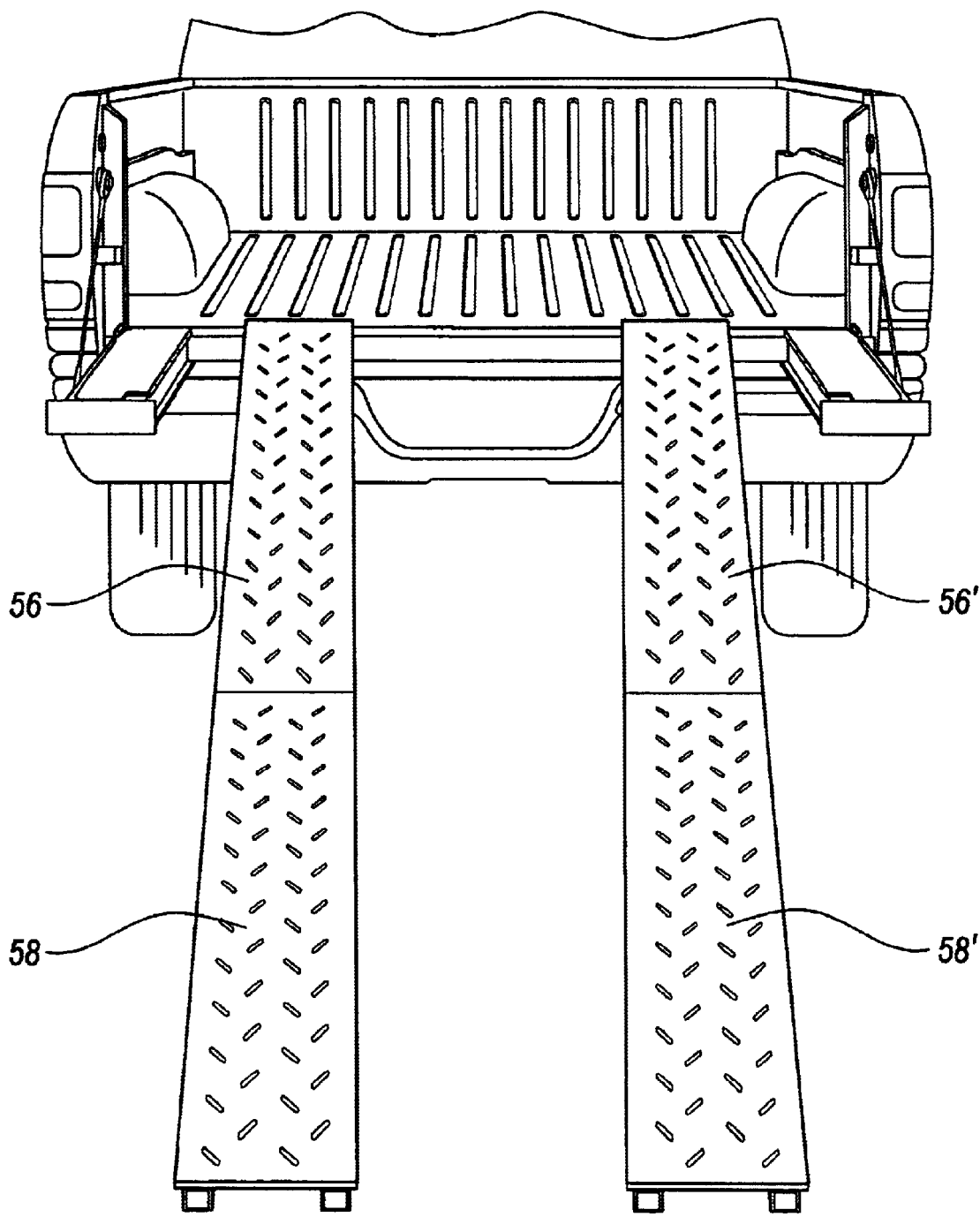
FIG. 9 is a rear view of a vehicle illustrating an apparatus shown in an open and horizontal position with ramps being attached to the apparatus to form an inclined surface extending from a ground surface to a truckbed of the vehicle, in accordance with the present invention.
Figure 10:
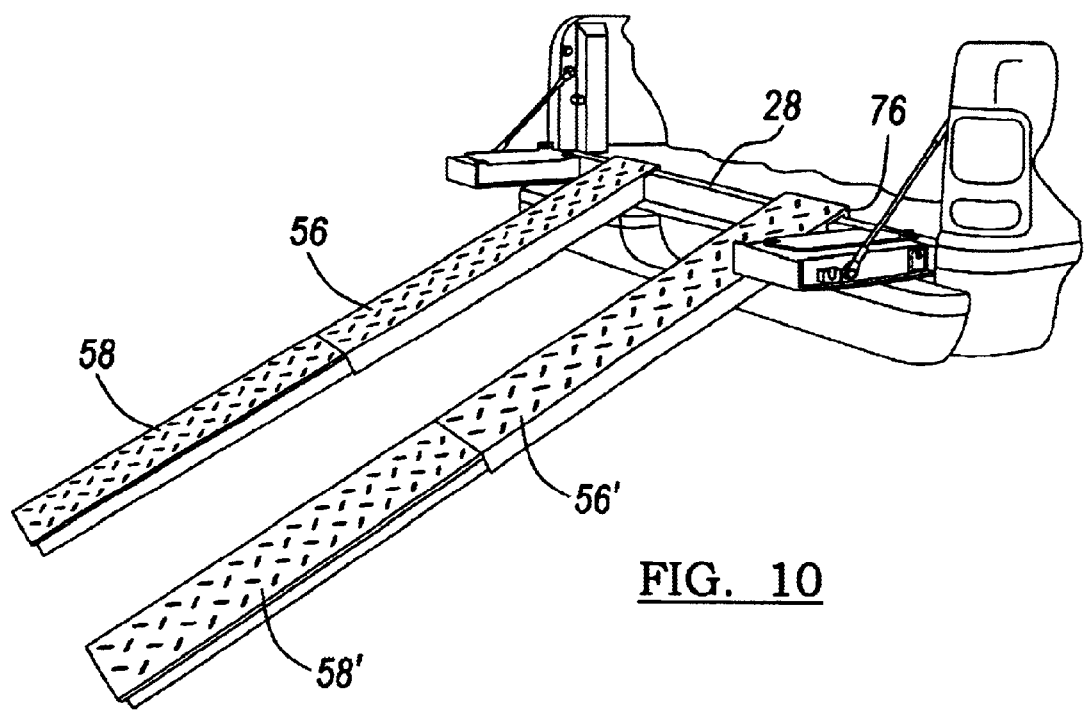
FIG. 10 is a perspective view of a vehicle illustrating an apparatus shown in an open and horizontal position with ramps being attached to the apparatus to form an inclined surface extending from a ground surface to a truckbed of the vehicle, in accordance with the present invention.

As illustrated in FIGS. 9 and 10, ramps 24 and 26 provide an inclined surface for objects to be rolled or dragged onto the truckbed of the vehicle. Preferably, ramps 24 and 26 are identical. Ramps 24 and 26 each have two main sections, an upper ramp section 56 and 56' and a lower ramp section 58 and 58'.

Figure 11:
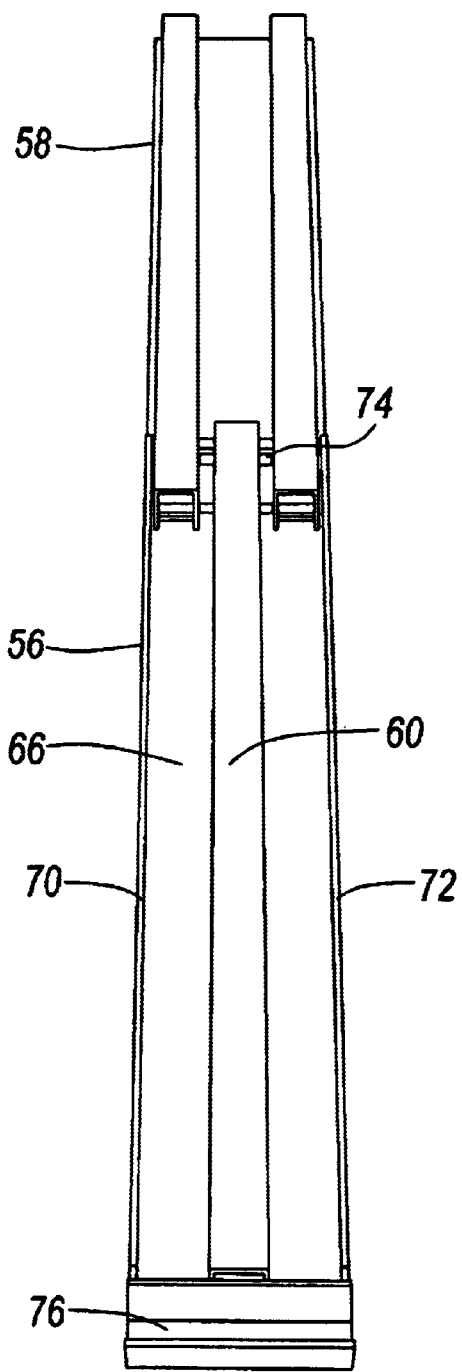
FIGS. 11 and 12 are bottom views of a ramp in an unfolded position, in accordance with the present invention.

Referring to FIG. 11, upper ramp section 56 includes a surface plate 66, a middle beam 60, side frames 70 and 72, and a c-channel 76. Upper ramp section 56 is connected to the lower ramp section 58 by a hinge pin 74.

Figure 12:
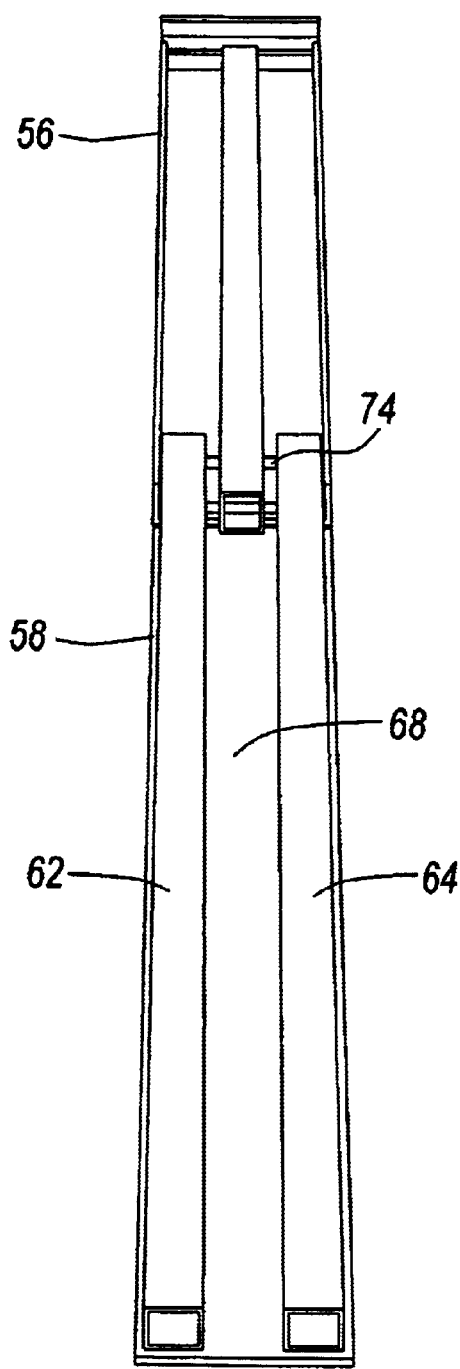

Lower ramp section 58, as illustrated in FIG. 12, includes a surface plate 68 and side beams 62 and 64. Ramp 24 or 26, as shown in FIG. 12, is designed in such a way that middle beam 60 of upper ramp section 56 and side beams 62 and 64 of lower ramp section 58 overlap, thereby forming a hinge when secured by hinge pin 74, which runs through the width of the middle and side beams. Hinge pin 74 allows ramp 24 or 26 to be unfolded, as seen in FIGS. 11 and 12, and folded, as seen in FIG. 13.

Figure 13:
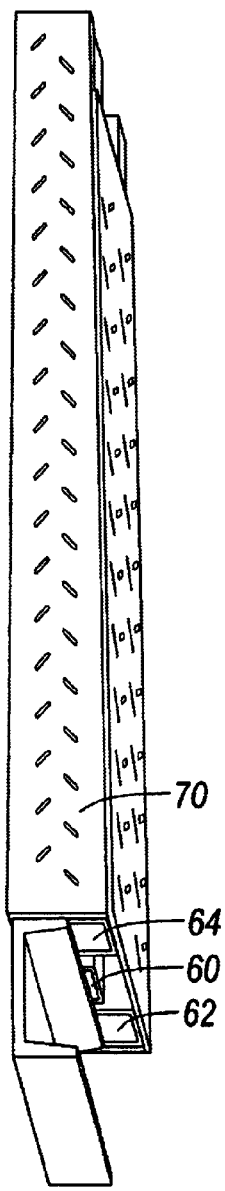
FIG. 13 is a side view of a ramp in a folded position, in accordance with the present invention.

As illustrated in FIG. 13, when the ramps 24 and 26 are folded the side beams 62 and 64 lie between the middle beam 60 and the side frames 70 and 72, respectively. This configuration minimizes the width of ramps 24 and 26 and allows ramps 24 and 26 to fit within receptacle 38, as shown in FIG. 1.

Figure 14:
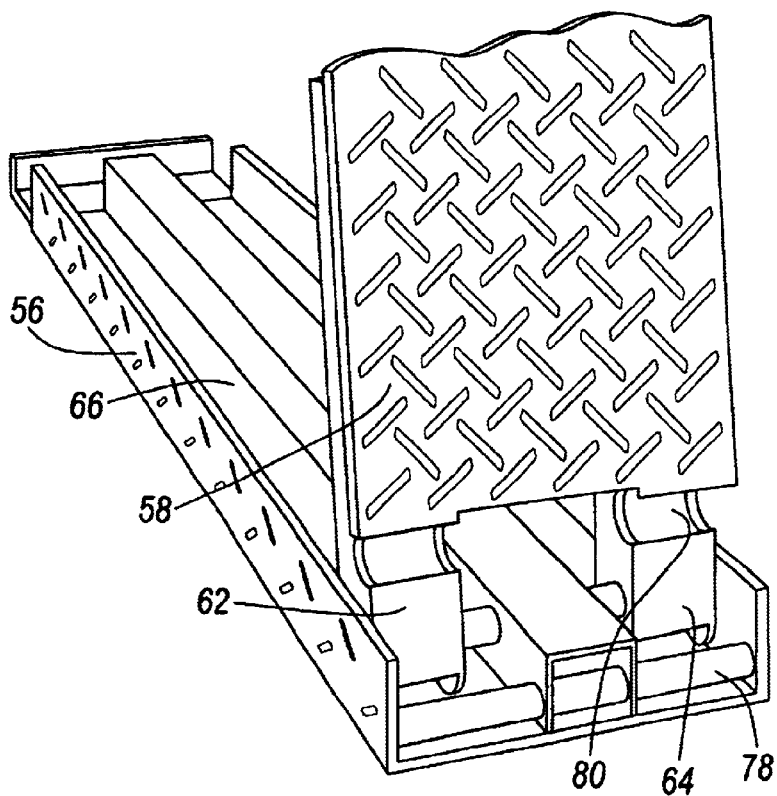
FIG. 14 is a perspective view of a hinged portion of a ramp, in accordance with the present invention.

As shown in FIG. 14, the hinged ends of beams 62 and 64 are rounded to enable ramp 24 or 26 to be folded and unfolded without surface plate 66 impeding the rotation of side beams 62 and 64. Ramps 24 and 26 are equipped with a stabilizing pin 78 and a stabilizing slot 80. When the ramps are unfolded, pin 78 fits into slot 80. This configuration allows pin 78 to bear some of the load, which increases the strength and stability of the ramps.

Ramps 24 and 26 are preferably constructed from aluminum to minimize weight. Alternatively, ramps 24 and 26 may be constructed from any suitable material, such as steel, plastic, fiberglass, metal alloys, or composites. The upper and lower sections 56 and 58 may include a surface plate 66 and 68 having top surfaces to prevent slipping or sliding of objects being loaded into the truck bed. For example, the non-slip surfaces may be knurled surfaces, as shown in FIG. 9.

Thus, the present invention provides an apparatus 20, which is easily converted from a tailgate to a ramp. In operation, housing 22 is lowered into a horizontal position, as shown in FIG. 3. Retainers 32 and 32' are then opened by disengaging latch mechanisms 40 and 40' located within housing base 28 and pivoting retainers 32 and 32' about the edges 49 and 49', respectively, to an open position, as shown in FIGS. 5 and 6. Ramps 24 and 26 are then removed by lifting the ramp 24 or 26 nearest housing base 28 out of receptacle 38, then sliding the remaining ramp 24 or 26 toward housing base 28 and lifting that ramp out of receptacle 38. Ramps 24 and 26 are unfolded after they have been removed from receptacle 38. C-channels 76 and 76' of ramps 24 and 26, which are integral with a top edge of each of upper ramp sections 56 and 56', may then be connected to housing base 28 to form a ramp, as shown in FIGS. 9 and 10. This procedure may be reversed to convert the apparatus 20 from a ramp to a tailgate.

Figure 15:
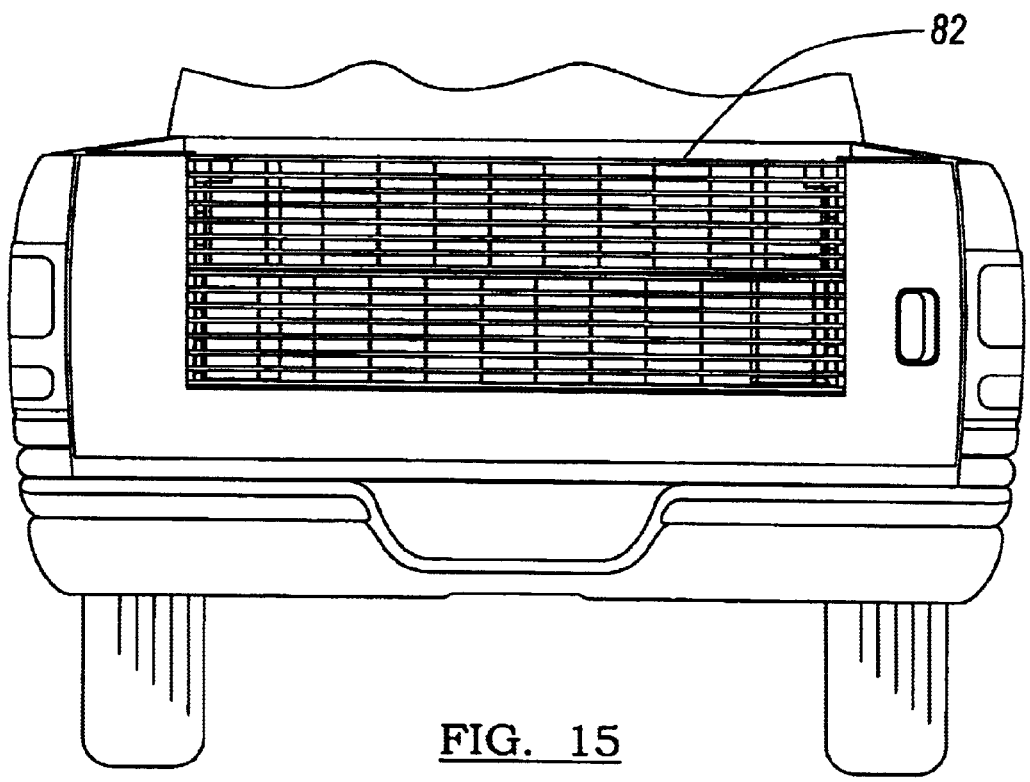
FIG. 15 is a rear view of a vehicle illustrating an apparatus shown in a closed and vertical position with a grate or mesh structure instead of a ramp inserted in the tailgate housing, in accordance with the present invention.

In FIG. 15, housing 22 is utilized for purposes other than storing ramps 24 and 26. A grate or mesh 82 is a lattice structure. Grate or mesh 82 can be constructed of steel, aluminum, plastic, fiberglass, metal alloys, or any other suitable materials. The dimensions of grate or mesh 82 are similar to ramps 24 and 26 when the ramps 24 and 26 are folded and in their storage position. Grate or mesh 82 is placed inside of housing 22 in the same fashion that ramps 24 and 26 are stored inside housing 22. By placing grate or mesh 82 inside of receptacle 38, an airgate is formed. This configuration allows the vehicle to achieve better gas mileage. Additionally, the grate or mesh 82 or either one or both of ramps 24 and 26 may be removed to provide sufficient space for a fifth wheel RV to be attached to the vehicle. This enables a fifth wheel RV to be hitched to the vehicle without having to remove the entire tailgate.

The present invention provides many advantages and benefits over the prior art. Ramps 24 and 26 are constructed in such a way to allow the ramps to be folded and stored within housing 22 of apparatus 20. This results in an apparatus 20 that occupies no truckbed space in excess of that of a conventional tailgate. In addition, the decrease in the loading capacity of the vehicle, as a result of the implementation of apparatus 20, is negligible.

As any person skilled in the art of systems and methods for loading objects into a vehicle will recognize from the previous detailed description and from the figures and claims, modifications and changes can be made to the preferred embodiments of the invention without departing from the scope of this invention defined in the following claims.

What is claimed is:

1. An apparatus for closing a storage compartment of a vehicle, the storage compartment is configured to receive items loaded from a supporting surface, the apparatus comprising:

a housing having a receptacle, wherein the housing is pivotably attachable to the storage compartment of the vehicle; and an at least one ramp having a first elongated portion having a stabilizing pin and second elongated portion having a stabilizing slot wherein the stabilizing pin engages the stabilizing slot for supporting the at least one ramp in a loading position, and wherein the first elongated portion is pivotally secured to the second elongated portion and foldable thereon, the folded first and second elongated portions are positionable within the receptacle of the housing when the at least one ramp is in a storage position, and detachable from the receptacle when the at least one ramp is positioned in the loading position.

2. The apparatus of claim 1, wherein the at least one ramp includes a c-channel fixedly disposed at an end of the at least one ramp for one of securing the at least one ramp to the housing when the at least one ramp is in the loading position and detaching the at least one ramp to the housing when the at least one ramp is in the storage position.

3. The apparatus of claim 1, wherein the housing is constructed of a material selected from the group consisting of: steel, aluminum, plastic, fiberglass, metal alloys, and composites.

4. The apparatus of claim 1, wherein the at least one ramp is a non-slip ramp.

5. The apparatus of claim 1, further comprising a grate, positionable in the housing in place of the at least one ramp.

6. The apparatus of claim 1, further comprising a retainer coupled to the housing for securing the at least one ramp in the receptacle of the housing.

7. A tailgate for closing a storage compartment of a vehicle, the storage compartment is configured to receive items loaded from a supporting surface, the tailgate comprising:
- a housing having a receptacle, the receptacle having opposing lips, wherein the housing is pivotably attachable to the storage compartment of the vehicle; and
- a means for loading the items having a first elongated portion having a stabilizing pin and a second elongated portion having a stabilizing slot wherein the stabilizing pin engages the stabilizing slot for supporting the means for loading in a loading position, wherein the means for loading is positionable within the receptacle and retained therein by the opposing lips of the receptacle when the means for loading is in a storage position, and detachable from the receptacle when the means for loading is positioned in the loading position.

8. The tailgate of claim 7, wherein the means for loading is an at least one ramp.

9. The tailgate of claim 8, wherein the at least one ramp includes a c-channel fixed to an end of the at least one ramp for securing the at least one ramp to the housing when the at least one ramp is in the loading position.

10. The tailgate of claim 7, wherein the means for loading is foldable.

11. The tailgate of claim 7, wherein the means for loading are at least two ramps.

12. The tailgate of claim 7, wherein the means for loading is a grate.

13. A method for performing one of loading and unloading a storage compartment of a vehicle, the storage compartment is configured to receive items loaded from a supporting surface, the method comprising:
- lowering a housing into a horizontal position, the housing having a receptacle and wherein the housing is pivotably attachable to the storage compartment of the vehicle and has side portions, wherein the side portions extend inwardly from an edge of the storage compartment of the vehicle;
- detaching an at least one loading surface from the receptacle;
- connecting the at least one loading surface to the housing to position the at least one loading surface in a loading position;
- positioning the at least one loading surface into the loading position by unfolding a first elongated portion from a second elongated portion of the at least one loading surface; and
- supporting the at least one loading surface in the loading position through cooperative engagement of a stabilizing pin disposed in the first elongated portion with a stabilizing slot disposed in the second elongated portion when the at least one loading surface is unfolded.

14. The method of claim 13, further comprising opening a retainer by disengaging a latch mechanism, wherein the retainer is used to secure the at least one loading surface within the receptacle.

15. The method of claim 13, wherein connecting the at least one loading surface to the housing further comprises engaging the housing with a c-channel located at an end of the at least one loading surface.

* * * * *